Figure 1:
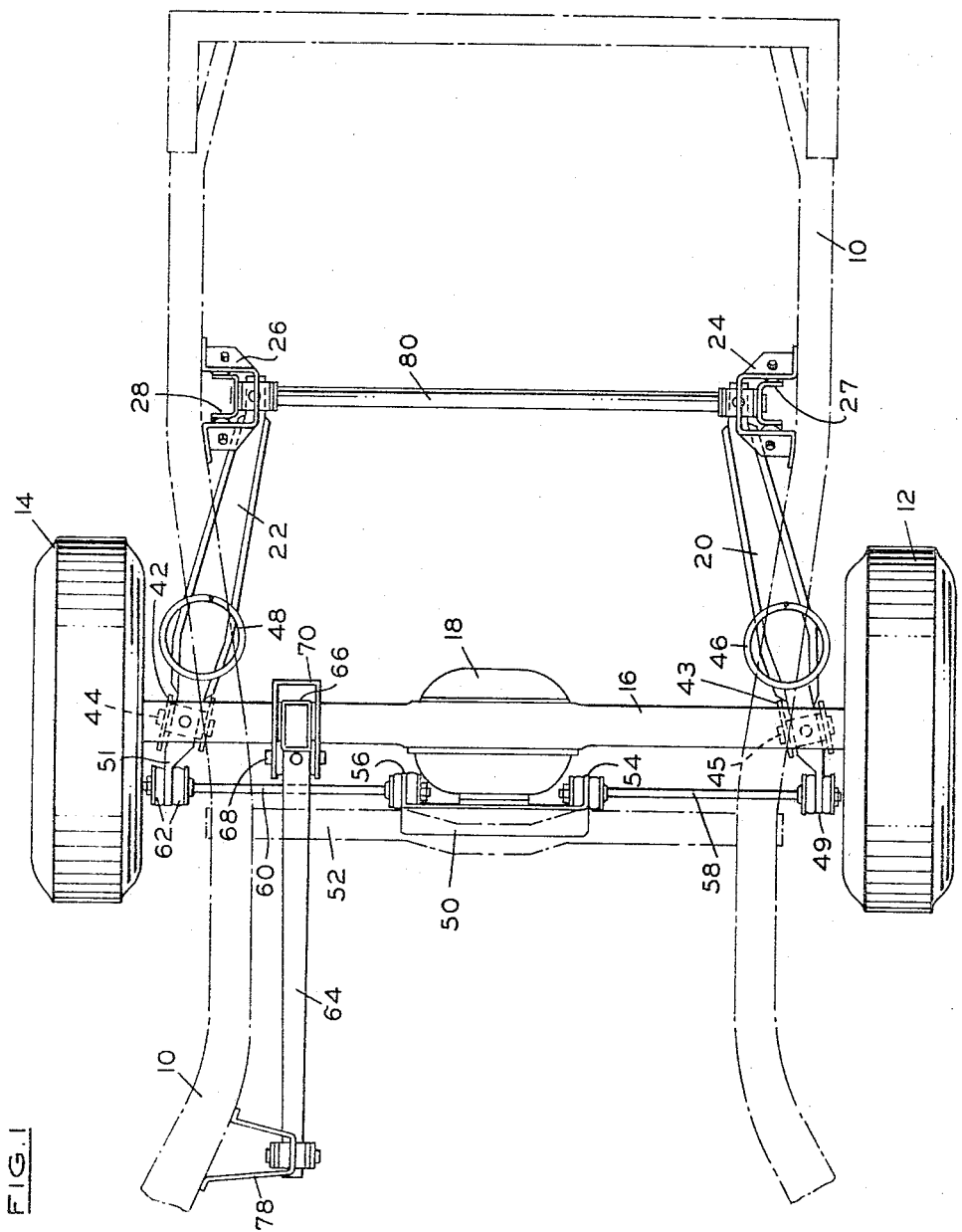

3,333,864
LINKAGE TYPE REAR SUSPENSION FOR
A MOTOR VEHICLE
William D. Allison, Grosse Pointe Farms, and Carlton
J. Willrich, Jr., Allen Park, Mich., assignors to Ford
Motor Company, Dearborn, Mich., a corporation of
Delaware
Filed Dec. 17, 1964, Ser. No. 419,173
15 Claims. (Cl. 280—124)

The present invention is generally related to rear suspension systems for motor vehicles, and more particularly to a rear suspension system of the linkage type.

It is the basic object of any motor vehicle suspension system to resiliently support the vehicle body upon the wheels and to isolate road irregularities from the passenger compartment. In addition, a superior vehicle suspension system should provide a soft boulevard ride, have good road holding qualities while cornering, and isolate noise and vibration from the vehicle body.

These features are not always compatible. In a conventional suspension structure, a soft ride usually leads to instability at high vehicle speeds or loss of precise cornering control. Similarly, a suspension system having exceptional vehicle control characteristics is usually accompanied by a harsh ride.

Therefore, it is the principal object of the present invention to provide a superior vehicle suspension system of the linkage type which combines these desirable operating characteristics.

It is a further object of the present invention to provide a rear suspension system that is so arranged that when a side force is applied to the sprung mass, the rear of the vehicle is displaced sideways relative to the rear axle. This lateral displacement is known in the art as lateral compliance. Lateral compliance is desirable because it reduces ride harshness and side shake.

It is another object of the present invention to provide a pair of suspension arms or links that extend forwardly and outwardly in a diverging relationship from the body to their attachment with the axle housing so that lateral displacement of the body is accompanied by a canting of the axle in the direction of understeer.

It is also an object of this invention to provide a rear suspension system with means permitting longitudinal wheel compliance. In accordance with the present invention, ride harshness caused by road irregularities is minimized by connecting the rear axle to the vehicle frame by suspension arms and a shackle system so that the axle may recede or move longitudinally in order to absorb road shocks with a minimum amount of disturbance. In the preferred embodiment, the shackles connecting two of the arms to the vehicle chassis are interconnected so the vehicle axle will move longitudinally and remain parallel to a transverse line whereby rear axle movement will not impart a steering deflection to the axle. In addition, rubber stop members are positioned to control the amount of longitudinal wheel compliance and to return the rear axle to its neutral position when the forces producing the wheel recession are removed.

It is still another object of the invention to provide a torque arm which interconnects the axle housing and the vehicle body. In accordance with the preferred embodiment of the present invention, the torque arm is connected to the axle housing by a resilient means which permits lateral displacement of the body relative to the axle. The torque arm prevents rotation of the axle during acceleration and braking. In a suspension of the present invention, the torque reaction is handled solely by the torque arm and is isolated from the other suspension arms and links.

Another object of the present invention is to connect the forward end of the torque arm to the vehicle body by a shackle device so that the torque arm cannot be loaded in either compression or tension during acceleration and braking. The diverging suspension arms carry all of the braking and accelerating forces while the torque arm acts as the sole torque reaction member to prevent rotation of the axle housing.

Figure 2:
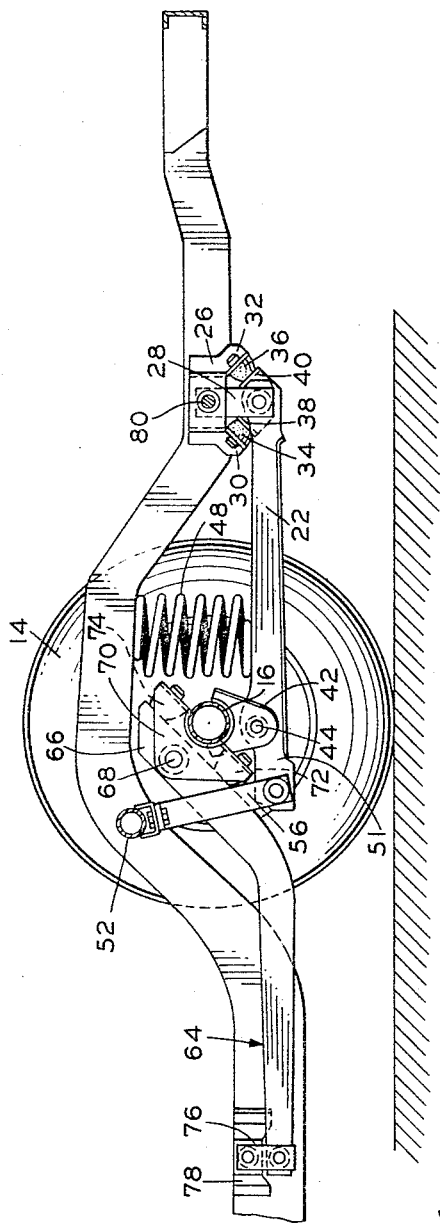

The many objects and advantages of the present invention will become amply apparent from the following discussion and the accompanying drawings, in which:

FIGURE 1 is a top plan view of the preferred embodiment of the present invention; and FIGURE 2 is a side elevational view of the suspension of FIGURE 1.

Referring now to the drawings for a more comprehensive understanding of this invention, FIGURE 1 illustrates a vehicle suspension having a chassis frame 10 that is supported upon a pair of left and right road wheels 12 and 14 by an improved suspension system. The wheels 12 and 14 are situated at the outer ends of an axle housing 16 which has a differential gear unit 18 disposed at its midpoint. The differential gear unit receives power from an engine and transmits driving torque to the wheels 12 and 14 through axle shafts contained within the housing 16.

The axle housing 16 is located longitudinally with respect to the vehicle chassis 10 by means of left and right suspension arms 20 and 22. The rear ends of the arms 20 and 22 are connected to chassis frame brackets 24 and 26 by means of shackles such as shackles 27 and 28. The shackle 28 has a pivotal connection with the frame bracket 26 at its upper end and a pivotal connection with the rear end of right suspension arm 22 at its lower end. Shackle 27 similarly connects left arm 20 with the frame bracket 24.

Each of the brackets 24 and 26 is provided with a pair of depending flanges 30 and 32 which carry rubber bumpers 34 and 36. The bumpers 34 and 36 are adapted to engage flanges 38 and 40 which extend from the shackle. This construction is illustrated in FIGURE 2 for the connection of the right arm 22 to the vehicle frame 10. The connection of the left arm 20 to the bracket 24 is of identical construction.

Each of the arms 20 and 22 extends forwardly and outwardly from the brackets 24 and 26 in a diverging fashion and is connected to the axle housing 16 by means such as depending brackets 42, 43 and pivot bolts 44, 45. The brackets 42, 43 are welded to the axle housing 16 and provide pivot supports for resilient bushings that are connected to the suspension arms and disposed about the pivot bolts.

Coil springs 46 and 48 are situated between the arms 20 and 22 and the side rails of the frame assembly 10. These springs support the sprung mass upon the suspension and the wheels 12 and 14.

Portions 49 and 51 of the arms 20 and 22 extend forwardly of the axle housing brackets 42, 43 and are connected to a yoke-shaped spring 50. The yoke spring 50 is secured to a frame cross member 52 which interconnects the side rails of the frame assembly 10. The yoke spring 50 straddles the forward portion of the differential housing 18 and has a pair of depending leg portions 54 and 56. A laterally extending link 58 interconnects the extending forward end 49 of left arm 20 and the depending leg 54 of the yoke spring 50. Similarly, a laterally extending link 60 interconnects the forward end 51 of right arm 22 and the depending leg 56 of spring 50. The inner and outer ends of links 58 and 60 are connected to the yoke spring 50 and to the ends of the suspension arms 20, 22 by a pair of rubber grommets such as grommets 62 at the outer end of link 60. The grommets are held in position by a nut which is threadedly received on the end of the link 60.

The depending legs 54 and 56 of the yoke spring 50 are resilient in the lateral direction. They serve to resiliently position the suspension arms 20 and 22 laterally with respect to the frame in a resilient manner by means of the lateral links 58 and 60. Because the axle housing 16 is connected to the arms 20 and 22, the yoke spring resiliently positions the chassis with respect to the axle housing 16 and the wheels 12 and 14.

A torque arm 64 extends forwardly from the axle housing 16. The torque arm 64 has the general configuration of a hockey stick with an upturned rear end 66 that is pivotally connected at 68 to a bracket 70 which is welded to the axle housing 16. A pair of resilient stop members 72 and 74 resiliently limit the amount of pivotal movement permitted by the pivot pin 68. The pivotal connection at 68 employs a rubber bushing which permits lateral deflection between the axle housing 16 and the arm 64. The forward end of the torque arm 64 is pivotally connected to a shackle 76 which has its upper end pivotally connected to a frame bracket 78.

The torque arm 64 is provided to prevent rotation of the axle housing 16 by transmitting torque reaction caused by acceleration and braking to the frame 10. Longitudinal forces are not carried by the torque arm 64 due to the presence of the shackle connnection 76. This connection permits the torque arm to move in a fore and aft direction relative to the frame 10.

The axle housing 16 is positioned longitudinally with respect to the vehicle body by the rear suspension arms 20 and 22. Each of these arms is connected to the vehicle chassis 10 by a shackle so that the axle housing 16 is free to move forwardly and rearwardly with respect to the frame 10. The movement of the shackles which connect the rearward arms 20 and 24 is limited by rubber bumpers or stop members 34, 36. In order to assure that the axle housing 16 will move with parallel translation, that is, to assure that the axle will not move longitudinally at one end to a greater extent than at the other end, the shackles 28 and 27 which connect the ends of the arms 20 and 24 with the frame brackets 24 and 26 are themselves interconnected by a torsional member 80. Due to the presence of this member, movement of one shackle, such as shackle 28, must be accompanied by an equal increment of movement by the other shackle 27. The interconnection provided by the bar 80 assures that the axle housing 16 will always move rearwardly in a parallel direction even though the forces acting upon the axle may be encountered by only a single wheel, such as occurs when one wheel strikes a road obstacle.

This arrangement permits the rear axle to recede or move rearwardly when one or both wheels strike an object in the road. This wheel recession reduces ride harshness by absorbing the horizontal force component created when the object is struck. Such an encounter creates both a vertical and a horizontal force. The suspension springs absorb the vertical force and the wheel recession absorbs the horizontal force. The action that occurs is akin to a boxer that rolls with a punch in order to lessen the blow.

Longitudinal movement of the axle must approximate parallel translation of the wheels 12 and 14. In cornering, the outside rear wheel is subject to a greater retarding force than the inside wheel, due to the greater load, the increased tire distortion, and the larger contact patch area of the outside wheel. If each of the rear wheels are allowed to move rearwardly independently of the other in proportion to the force imposed upon it, in cornering, the rear axle will yaw or steer in an oversteering direction. To minimize this oversteering effect, the rear shackles 27 and 28 permitting longitudinal movement of the rear axle housing 16 are transversely connected by the torsion member 80. The torsion member 80 holds the shackles 27 and 28 parallel to each other or on a common plane and, thus, longitudinal movement approximating parallel translation is imposed upon the axle housing 16.

Rear axle acceleration and braking torque and pinion shaft angle of the differential gear unit are controlled by the single torque arm 64 located at the right side of the vehicle. The method of its attachment to the axle housing 16 described previously which includes the single pivot 68 with the rubber cushions 72 and 74 on either side thereof, allows limited rotational movement or "wind up" of the axle housing 16 during acceleration and braking. The attachment provides clearance for operation of the transverse link 60. The torque arm 64 extends forwardly from the axle 16 and the forward end is attached to the frame by a vertical shackle 76. The shackle 76 allows free fore and aft movement of the torque arm 64 and transmits vertical forces to the frame. The transverse position of the torque arm and its length and the height of the forward pivot bracket 78 are computed to provide equal loading of the rear wheels 12, 14 upon acceleration. The torque arm 64 can be designed to control rearward tilt on acceleration to any desired degree. It also offers a means of providing maximum rear wheel ground reaction during acceleration.

The rear suspension described above is also arranged so that when a side force is applied to the sprung mass, the rear of the vehicle body is displaced sideways relative to the rear axle 16. This lateral displacement is permitted by the resilient flexibility of the spring metal legs 54 and 56 of yoke spring 50 which interconnect the axle housing 16 and the frame 10. Since the front of the body does not move laterally, the body undergoes angular rotation about a vertical axis through the center of the front tread. Each point on the sprung mass rotates about this axis in proportion to its distance from the axis and the amount of lateral displacement or compliance at the rear suspension.

This lateral displacement of the sprung mass at the rear axle is utilized to effect a steering movement of the rear axle 16 in a direction to oppose the side force. The steering of the rear axle 16 is accomplished by the angular placement of the two suspension arms 20 and 22, connecting the axle 16 to the frame 10. As the frame pivot supports 24 and 26 of the suspension arms 20 and 22 rotate around the vertical front axis, the pivot on one side of the car goes forward and out and the opposite pivot moves in and rearwardly relative to the center of the rear axle 16. The fixed length of each of the suspension arms 20 and 22 imparts a steering movement to the rear axle 16 according to the spacing and angular positions of the arms 20, 22.

Inasmuch as the steering movement applied to the rear axle 16 is in a direction to oppose the side force, it is considered to be in the direction of understeer. The understeering produced by lateral compliance is proportional to the lateral force and is not appreciably effective by vehicle ride height in contrast to the pronounced effect of ride height on the rear axle steer produced by body roll.

It will be noted from the drawings that the suspension arms 20 and 22 are angled with respect to each other in a forwardly diverging fashion. With this arrangement, side thrust understeer is provided. When the vehicle having the suspension in FIGURE 1 is executing a turn to the left, the vehicle frame and body will tend to shift to the right under the influence of centrifugal force. This lateral shift will be permitted due to flexibility of the spring legs 54 and 56.

When the body and frame 10 shifts to the right, the right-hand arm 22 will become more generally parallel to the longitudinal axis of the vehicle. This will cause the right wheel 14 to move slightly forwardly as the right arm 22 tends to straighten out in its direction. At the same time, left arm 20 will become arranged at a sharper angle to the axle housing 16 when the chassis shifts to the right. This movement of the left arm 20 will tend to pull the left wheel 12 rearwardly. Because the left wheel 12 is moved rearwardly and the right wheel 14 is moved forwardly, the wheels will tend to steer the vehicle out of the curve which produced the centrifgual force. This is known as understeer. Because the understeer is reponsive to a side force, it is called side thrust understeer.

It is generally recognized by those skilled in the art that side thrust understeer increases the controllability of the vehicle during cornering. It generally provides an increase in the preciseness of the steering.

In addition to providing a means of obtaining rear suspension understeering that is insensitive to ride height, lateral compliance provides other benefits in the forms of road holding on corners and a reduction in side shake. In a solid axle rear suspension system individual vertical movement of either rear wheel imparts a sideways push to the sprung mass at the roll center. The application of lateral forces to the body produces noise, vibration and side shake. Lateral compliance or flexibility between the sprung mass and the rear axle permits the axle to follow road irregularities with a substantial reduction in the magnitude of lateral forces between the body and axle in comparison with the conventional rear suspension. The net effect on the body is a pronounced reduction in noise, vibration and harshness. The net effect on the axle is a greatly increased traction on corners due to the diminished peak side forces applied to the tires.

The torque arm 64 is connected at each of its ends by means which permit the lateral movement between the frame 10 and the axle housing 16. The shackle connection 76 permits the right end of the axle housing 16 to move forwardly or rearwardly as dictated by the side thrust understeer geometry of the suspension. The shackle 76 transfers brake and acceleration reaction forces which tend to rotate the axle housing 16 from that axle housing to the frame 10 and, thus permits the arm 64 to function as a torque arm.

The longitudinal forces on the axle housing 16 that are caused by acceleration and braking are handled by the suspension arms 20 and 22. Because the shackle 76 permits unrestricted longitudinal displacement of the torque arm 64, these forces are not carried by that arm.

The foregoing description constitutes the presently preferred embodiment of this invention. Modifications and alterations may occur to those skilled in the art which will come within the scope and spirit of the following claims.

What is claimed is:

1. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends pivotally connected to said axle housing, a pair of movable links connecting the other ends of said suspension arms to said frame, resilient means constructed to limit the movement of said links, a torque arm connected to said axle housing and to said and constructed to resist rotational movement of said axle housing and to said frame and constructed to resist rotational movement of said axle housing about its own axis shackle means connecting one end of said torque arm to said frame and constructed to permit fore and aft movement of said torque arm with respect to said frame.

2. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends connected to said axle housing, a pair of shackle means connecting the other ends of said suspension arms to said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle.

3. A vehicle suspension system, a vehicle frame, an axle housing, a pair of road wheels situated at the outer ends of said axle housing, suspension means interconnecting said frame and said axle housing, said suspension means comprising a pair of suspension arms each having one of their ends connected to said axle housing, a pair of shackle means connecting the other ends of said suspension arms to said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, said suspension arms being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

4. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends connected to said axle housing, a pair of shackle means connecting the other ends of said suspension arms to said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, said laterally resilient means comprising a spring secured to said frame and having depending laterally resilient leg portions, link means interconnecting said suspension arms and said depending leg portions, said suspension arms being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

5. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends connected to said axle housing, a pair of shackle means connecting the other ends of said suspension arms to said frame, resilient means constructed to limit the pivotal movement of said shackle means, torsion means interconnecting said pair of shackle means and constructed so that said pair of shackle means swing conjointly.

6. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends pivotally connected to said axle housing, a pair of shackle means connecting the other ends of said suspension arms to said frame and constructed to permit said arms to move longitudinally of said frame, resilient means constructed to limit the pivotal movement of said shackle means, torsion means interconnecting said pair of shackle means and constructed so that said pair of shackle means swing conjointly.

7. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends pivotally connected to said axle housing, a pair of shackle means connecting the other ends of said suspension arms to said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, said laterally resilient means comprising a yoke spring secured to said frame and having depending laterally resilient leg portions, link means interconnecting said suspension arms and said depending leg portions, a torque arm connected to said axle housing by resilient pivot means, means connecting one end of said torque arm to said frame and constructed to permit said torque arm to be displaced longitudinally while resisting vertical displacement of said one end relative to said frame, the connection between said torque arm and said axle housing being adapted to resiliently restrict windup of said axle housing upon acceleration of said wheels.

8. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends pivotally connected to said axle housing, a pair of shackle means connecting the other ends of said suspension arms to said frame and constructed to permit said arms to move longitudinally of said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, a torque arm connected to said axle housing by resilient pivot means and to said frame, the connection between said torque arm and said axle housing being adapted to resiliently restrict windup of said axle housing upon acceleration of said wheels, said suspension arms being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

9. A vehicle suspension system including a vehicle frame, an axle housing, a pair of road wheels situated at the outer ends of said axle housing, suspension means interconnecting said frame and said axle housing, said suspension means comprising a pair of suspension arms each having one of their ends pivotally connected to said axle housing, a pair of shackle means connecting the other ends of said suspension arms to said frame and constructed to permit said arms to move longitudinally of said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, said laterally resilient means comprising spring means secured to said frame and having depending laterally resilient leg portions and link means interconnecting said suspension arms and said depending leg portions, a torque arm connected to said axle housing by resilient pivot means and to said frame, the connection between said torque arm and said axle housing being adapted to resiliently restrict windup of said axle housing upon acceleration of said wheels, said suspension arms being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

10. A vehicle suspension system including a vehicle frame, an axle housing, a pair of of road wheels situated at the outer ends of said axle housing, suspension means interconnecting said frame and said axle housing, said suspension means comprising a pair of suspension arms each having one of their ends pivotally connected to said axle housing, a pair of shackle means connecting the other ends of said suspension arms to said frame and constructed to permit said arms to move longitudinally of said frame, resilient means constructed to limit the pivotal movement of said shackle means, torsion means interconnecting said pair of shackle means and constructed so that said pair of shackle means swing conjointly, laterally resilient means interconnecting said frame and said suspension arms and constructed to position said axle housing and suspension arms laterally with respect to the longitudinal center line of said vehicle, said laterally resilient means comprising a yoke spring secured to said frame and having depending laterally resilient leg portions, link means interconnecting said suspension arms and said depending leg portions, a torque arm connected to said axle housing by resilient pivot means, the connection between said torque arm and said axle housing being adapted to resiliently restrict windup of said axle housing upon acceleration of said wheels, shackle means connecting one end of said torque arm to said frame and constructed to permit said torque arm to be displaced longitudinally while resisting vertical displacement of said one end of said torque arm relative to said frame, said suspension arms being angled forwardly and outwardly in a diverging fashion with respect to a vertical plane containing the longitudinal center line of said vehicle, said suspension means permitting said vehicle frame to move laterally with respect to said axle housing whereby one end of said axle housing is moved forwardly and the other end of said axle housing is moved rearwardly to provide an understeer effect.

11. A suspension system for a vehicle including a vehicle frame, an axle housing, a pair of road wheels rotatably mounted at the outer ends of said axle housing, suspension means interconnecting said frame and said axle housing, said suspension means comprising a pair of suspension arms, each of said arms having one end pivotally connected to said axle housing and the other end pivotally connected to said frame, laterally resilient means connected to said frame and constructed to position said axle housing laterally with respect to the longitudinal center line of said vehicle, a torque reaction means constructed to resist rotation of said axle housing, said torque reaction means comprising a structural member having one end secured to said axle housing and extending longitudinally therefrom, means interconnecting the other end of said member and said frame, said just mentioned means being constructed to substantially prevent vertical movement of said other end of said member while permitting fore and aft movement of said member with respect to said frame.

12. A suspension system for a vehicle including a vehicle frame, an axle housing, a pair of road wheels rotatably mounted at the outer ends of said axle housing, suspension means interconnecting said frame and said axle housing, said suspension means comprising a pair of suspension arms, each of said arms having one end pivotally connected to said axle housing and the other end pivotally connected to said frame, laterally resilient means connected to said frame and constructed to position said axle housing laterally with respect to the longitudinal center line of said vehicle, a torque reaction means constructed to resist rotation of said axle housing, said torque reaction means comprising a structural member having one end secured to said axle housing and extending longitudinally therefrom, shackle means interconnecting the other end of said structural member and said frame, said shackle means being constructed to prevent the rotation of said member about the axis of said axle housing while permitting fore and aft movement of said member, said suspension arms being angled forwardly and outwardly in a diverging fashion with respect to a vertical plane containing the longitudinal center line of said vehicle frame, said suspension means permitting said vehicle frame to move laterally with respect to said axle housing whereby one end of said axle housing is moved forwardly and the other end of said axle housing is moved rearwardly to provide an understeer effect.

13. A suspension system for a vehicle including a vehicle frame, an axle housing, a pair of road wheels rotatably mounted at the outer ends of said axle housing, a plurality of suspension means interconnecting said frame and said axle housing, one of said means being constructed to resist rotation of said axle housing, said one means comprising a structural member having its rear end secured by resilient means to said axle housing and extending forwardly therefrom, said resilient means being constructed to resiliently resist rotation of said axle housing about its axis relative to said member, means interconnecting the other end of said member and said frame, said just mentioned means being constructed to substantially prevent vertical movement of said other end of said member while permitting fore and aft movement of said member with respect to said frame.

14. A suspension system according to claim 13 said other suspension means comprising a pair of suspension arms each having one end pivotally connected to said axle housing, shackle means connecting the other ends of said arms to said vehicle frame.

15. A vehicle suspension system having a vehicle frame, an axle housing, and suspension means constructed to connect said vehicle frame to said axle housing, said suspension means comprising a pair of suspension links each having a pivotal connection at one of their ends with said frame and a pivotal connection at their other ends with said axle housing, said suspension links being arranged in a forwardly and outwardly diverging manner, transverse link means resiliently positioning said axle housing with respect to said frame, a torque arm constructed to transfer brake and acceleration torque reaction from said axle housing to said frame, resilient connection means joining said torque arm to said axle housing, shackle means interconnecting one end of said torque arm and said frame, said suspension means permitting said vehicle frame to move laterally with respect to said axle housing whereby one end of said axle housing is moved forwardly and the other end of said axle housing is moved rearwardly to provide an understeer effect.

References Cited

UNITED STATES PATENTS

| 1,164,618 | 12/1915 | Hassler | 267—67 |
| 1,924,718 | 8/1933 | Hallett | 267—67 |
| 2,998,265 | 8/1961 | Kozicki | 180—73 X |

FOREIGN PATENTS 1,218,533  12/1959  France.

BENJAMIN HERSH, *Primary Examiner.*

A. HARRY LEVY, *Examiner.*

W. A. MARCONTELL, M. SALES, *Assistant Examiners.*